United States Patent
Said et al.

(10) Patent No.: US 9,480,967 B2
(45) Date of Patent: Nov. 1, 2016

(54) METAL ORGANIC FRAMEWORK ADSORBENT FOR SOLAR ADSORPTION REFRIGERATION

(71) Applicant: KING FAHD UNIVERSITY OF PETROLEUM AND MINERALS, Dhahran (SA)

(72) Inventors: Syed Ahmed M. Said, Dhahran (SA); Shakeel Ahmed, Dhahran (SA); Najam Ul Qadir, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 352 days.

(21) Appl. No.: 14/192,063

(22) Filed: Feb. 27, 2014

(65) Prior Publication Data
US 2015/0238930 A1    Aug. 27, 2015

(51) Int. Cl.
*B01J 20/22*    (2006.01)

(52) U.S. Cl.
CPC .................................. *B01J 20/226* (2013.01)

(58) Field of Classification Search
CPC ..................................................... B01J 20/226
USPC ........................................................ 502/401
See application file for complete search history.

(56) References Cited

U.S. PATENT DOCUMENTS

2012/0289399 A1    11/2012  Hwang et al.
2013/0157837 A1    6/2013   Banerjee et al.

FOREIGN PATENT DOCUMENTS

DE    102011112974    1/2013
DE    102011116863    4/2013

OTHER PUBLICATIONS

Dhakshinamoorthy et al. "Metal Organic Frameworks as Solid Catalysts in Condensation Reactions of Carbonyl Groups" Advanced Synthesis & Catalysis, vol. 355, Issue 2-3, Jan. 16, 2013, pp. 247-268.*
K.P. Prasantha, Phani Rallapallia, Manoj C. Raja, H.C. Bajaja, Raksh Vir Jasra, "Enhanced hydrogen sorption in single walled carbon nanotube incorporated MIL-101 composite metal-organic framework," International Journal of Hydrogen Energy, vol. 36, Issue 13, Jul. 2011, pp. 7594-7601.
Felix Jeremias et al., "MIL-100(Al, Fe) as water absorbents for heat transformation purposes—a promising application", J. Mater. Chem. (2012), pp. 10148-10151.

* cited by examiner

*Primary Examiner* — Colleen Dunn
*Assistant Examiner* — Haytham Soliman
(74) *Attorney, Agent, or Firm* — Richard C. Litman

(57) ABSTRACT

The metal organic framework adsorbent for solar adsorption refrigeration is a nanocomposite made from a metal organic framework matrix having carbon nanotubes incorporated therein. Preferably, the metal organic framework is composed of MIL-100(Fe), and the carbon nanotubes are functionalized with carboxyl (COOH) groups. In order to prepare the metal organic framework adsorbent, carbon nanotubes functionalized with carboxyl (COOH) groups are first added to an aqueous solution of a precursor salt, such as ferric trinitrate nonahydrate ($Fe(NO_3)_3 \cdot 9H_2O$), to form a first mixture. The first mixture is then sonicated and a 1,3,5 benzenetricarboxylic acid ligand is added thereto to form a second mixture. The second mixture is then sonicated and heated, and the metal organic framework nanocomposite is separated therefrom, preferably as a powder.

17 Claims, No Drawings

METAL ORGANIC FRAMEWORK ADSORBENT FOR SOLAR ADSORPTION REFRIGERATION

BACKGROUND OF THE INVENTION

1. Field of the Invention

The present invention relates to evaporation-adsorption refrigeration, and particularly to a metal organic framework modified with functionalized carbon nanotubes used as an adsorbent for solar adsorption refrigeration.

2. Description of the Related Art

More than half of the energy consumption, and consequently the carbon dioxide emissions, of modern buildings originate from air conditioning processes. These are traditionally based on electrically-driven, mechanical compression chillers and heat pumps or classical burner systems. This demand is expected to rise in the future due to increased living standards and global climate change. However, with alternative technologies, less exergetic (i.e., closer to equilibrium) forms of energy, even low-temperature waste heat from industrial processes, can be employed for both heating and cooling. Solar heat as driving energy is particularly interesting due to the high coincidence of cooling demands and solar irradiation. While multiple working principles for thermally driven heat pumps can be realized, the evaporation-adsorption method has proven most feasible for this purpose.

The evaporation-adsorption process renders cooling applications independent of electrical energy. If used for heating, the incorporation of environmental heat allows for considerable fuel savings. The coefficient of performance (i.e., the relation between useful and driving heat), power density, cost, and operating lifetime of the complete machine are governed by the sorption material and its figures of merit, i.e., porosity, water sorption capacity, hydrophilicity and hydrothermal stability. The achievable loading lift, and also the required desorption temperature, directly depends on the hydrophilicity of the material, i.e., the $p/p_0$ value at which adsorption occurs (ideally at $0.05<p/p_0<0.4$ for realistic performance characteristics), and, thus, the shape of the adsorption isotherm. Apart from stability issues, this is the main reason why silica gel and zeolites are currently used in commercial systems, although several metal organic frameworks (MOFs) have already shown a higher water sorption capacity. Due to the outperforming microporosities of MOF materials, the development of long-term water stable MOF with sufficient hydrophilicity would obviously help to establish sorption cooling in general applications.

Despite their desirable properties, MOFs suffer from two major deficiencies relative to conventional adsorbents, such as silica gel, activated carbon and zeolites. Namely, a majority of these materials (MOFs) are known to disintegrate rapidly in an aqueous medium, while silica gel, activated carbon and zeolite adsorbents retain structural integrity inside water, and MOFs are characterized by considerably lower values of thermal conductivity relative to the conventional adsorbents. Amongst all reported MOFs, MIL-100 has been reported to possess the highest hydrothermal stability. However, its thermal conductivity is still below the minimum threshold required for an adsorbent material to be a considered viable option in an adsorption refrigeration system.

MIL-100 is a metal organic framework material, having the empirical formula 3D-$\{M_3O(X)(H_2O)_2[btc]_2 \cdot nH_2O\}$ (M=Cr, Fe, or Al; X=OH, F; btc=benzene-1,3,5-tricarboxylate (or trimesate)), and has received recent attention with respect to its catalytic, gas separation and gas storage properties. The porosity of MIL-100 originates from both 25 Å and 29 Å mesopores, which are accessible via 5.5 Å and 8.6 Å windows, respectively. As both MIL-100(Al) and MIL-100(Fe) form under quite harsh synthesis conditions (pH=0.6, T=210° C., and pH<1, T=150° C., respectively), a fundamental water stability can be anticipated. For environmental considerations, MIL-100(Fe) is far more desirable. It would obviously be desirable to be able to modify MIL-100 (Fe) for efficient use as an adsorbent material in a solar adsorption refrigeration system.

Thus, a metal organic framework adsorbent for solar adsorption refrigeration and method of making the same solving the aforementioned problems is desired.

SUMMARY OF THE INVENTION

The metal organic framework adsorbent for solar adsorption refrigeration is a nanocomposite made from a metal organic framework matrix having carbon nanotubes incorporated therein. Preferably, the metal organic framework is composed of MIL-100(Fe), and the carbon nanotubes are functionalized with carboxyl (COOH) groups.

In order to prepare the metal organic framework adsorbent for solar adsorption refrigeration, carbon nanotubes functionalized with carboxyl (COOH) groups are first added to an aqueous solution of a precursor salt, such as ferric trinitrate nonahydrate ($Fe(NO_3)_3 \cdot 9H_2O$), to form a first mixture. The first mixture is then sonicated and a 1,3,5 benzenetricarboxylic acid ligand is added thereto to form a second mixture. The second mixture is then sonicated and heated, and the metal organic framework nanocomposite is separated therefrom through centrifugation or the like. The separated metal organic framework nanocomposite is then washed and dried, resulting in the metal organic framework adsorbent, preferably in powdered form.

These and other features of the present invention will become readily apparent upon further review of the following specification.

DETAILED DESCRIPTION OF THE PREFERRED EMBODIMENTS

The metal organic framework adsorbent for solar adsorption refrigeration is a nanocomposite made from a metal organic framework matrix having carbon nanotubes incorporated therein. Preferably, the metal organic framework is composed of MIL-100(Fe), and the carbon nanotubes are functionalized with carboxyl (COOH) groups.

The functionalized carbon nanotubes are prepared using acid treatment of the CNTs in order to attach carboxyl (COOH) groups onto their sidewalls. The acid solution may be nitric acid, sulfuric acid, or a mixture thereof. In the preferred embodiment, a mixture of sulfuric acid and nitric acid with a volume ratio of 3:1 is used. After the CNTs are immersed into the acid solution, sonication and then refluxing in the acid solution are performed in order to improve the covalent sidewall functionalization of the CNTs. It should be understood that the sonication and refluxing are performed at a sufficiently high temperature to attach COOH groups onto the sidewalls of the CNTs.

Following sonication and refluxing in the acid solution, the acid solution is diluted and then passed through a filter. The acid-treated CNTs are then washed and heat treatment is performed to the filtered CNTs in order to remove residues, such as amorphous carbon and the like. In the preferred embodiment, heat treatment is performed at a temperature of about 150° C. for two days under vacuum.

As an example of the synthesis of the functionalized carbon nanotubes, 2 g of CNTs were added to a mixture of 35 mL of $HNO_3$ and 105 mL of $H_2SO_4$ in a 100 mL flask equipped with a condenser. The mixture was then vigorously stirred before immersion into an ultrasonic bath, with sonication performed at a frequency of 40 kHz for 30 minutes. The mixture was then stirred for 4 hours under reflux, with the oil bath temperature being increased gradually from 90° C. to 133° C. After cooling, the reaction mixture was diluted with 500 mL of deionized water. Vacuum filtration was then performed with 0.1 µm filter paper, and the functionalized CNTs were dispersed in 500 mL of water and then vacuum filtered. The resultant filtered cake was rinsed with 200 mL of water, and then rinsed with 200 mL of acetone and tetrahydrofuran (THF) five times. Following rinsing, the functionalized CNTs were dried under vacuum for two days at a temperature of 150° C., resulting in a 60 wt % yield of CNTs functionalized with carboxyl (COOH) groups.

For synthesis of the nanocomposite, the precursor salt used for the synthesis of MIL-100(Fe) during the in situ fabrication of CNT/MIL-100(Fe) nanocomposite powders may be ferric trichloride hexahydrate ($FeCl_3.6H_2O$), ferrous sulfate heptahydrate ($FeSO_4.7H_2O$), or ferric trinitrate nonahydrate ($Fe(NO_3)_3.9H_2O$). In the preferred embodiment, ferric trinitrate nonahydrate ($Fe(NO_3)_3.9H_2O$) is used as the precursor salt.

After the functionalized CNTs are immersed in an aqueous solution of $Fe(NO_3)_3.9H_2O$, additional treatments are carried out in order to improve the dispersion of functionalized CNTs within the salt solution. The treatments may include sonication, stirring with an agitator, or both. This treatment homogeneously disperses the functionalized CNTs inside the solution.

Following this treatment, 1,3,5 benzenetricarboxylic acid is added to the salt solution as a ligand for the synthesis of MIL-100. Sonication is then performed again for about 2 hours at room temperature. Sonication after the addition of ligand to the salt solution is performed in order to homogeneously disperse the ligand molecules inside the salt solution. Heat treatment is then carried out for a period of about 3 days in a Teflon®-lined pressure vessel, maintained at a temperature of about 150° C.

Following the heat treatment of the reaction mixture, centrifugation at 10,500 rpm for 25 minutes is carried out in order to decant the surplus solvent, retaining only the by-product of the reaction taking place during the heat treatment. The centrifuged product is then washed in order to remove the traces of the unreacted components, and then heat treatment is performed in air at a temperature of almost 100° C., resulting in the final CNT/MIL-100(Fe) nanocomposite powders.

To illustrate the synthesis, 2.43 g (6.01 mmol) $Fe(NO_3)_3.9H_2O$ was added to 30 mL of distilled water, and the functionalized CNTs were added. The specific mass of functionalized CNTs was dependent upon the desired volume fraction in the resultant nanocomposite powder. Sonication was then applied for 12 hours at room temperature. Then 0.84 g (4 mmol) of 1,3,5 benzenetricarboxylic acid was added, and sonication was applied again for two hours at room temperature. Heat treatment was then performed for a period of 3 days in a Teflon®-lined pressure vessel, maintained at a temperature of 150° C. Following the heat treatment of the reaction mixture, centrifugation at 10,500 rpm for 25 minutes was performed, and the resultant product was washed and dried in air at a temperature of almost 100° C. The resultant product was the desired CNT/MIL-100(Fe) nanocomposite powder used as an adsorbent for solar adsorption refrigeration.

It is to be understood that the present invention is not limited to the embodiments described above, but encompasses any and all embodiments within the scope of the following claims.

We claim:

1. A method of making a metal organic framework adsorbent for solar adsorption refrigeration, comprising the steps of:
   stirring together carbon nanotubes, nitric acid and sulfuric acid to form a solution;
   sonicating the solution;
   stirring and refluxing the solution;
   diluting the solution with deionized water;
   filtering carbon nanotubes functionalized with carboxyl (COOH) groups from the solution;
   adding the carbon nanotubes functionalized with carboxyl (COOH) groups to an aqueous solution of a precursor salt to form a first mixture;
   sonicating the first mixture;
   adding a 1,3,5 benzenetricarboxylic acid ligand to the first mixture to form a second mixture;
   sonicating the second mixture;
   heating the second mixture; and
   separating a resulting metal organic framework nanocomposite from the second mixture.

2. The method of making a metal organic framework adsorbent for solar adsorption refrigeration as recited in claim 1, wherein the precursor salt is selected from the group consisting of ferric trichloride hexahydrate ($FeCl_3.6H_2O$), ferrous sulfate heptahydrate ($FeSO_4.7H_2O$), and ferric trinitrate nonahydrate ($Fe(NO_3)_3.9H_2O$).

3. The method of making a metal organic framework adsorbent for solar adsorption refrigeration as recited in claim 1, wherein the precursor salt comprises ferric trinitrate nonahydrate ($Fe(NO_3)_3.9H_2O$).

4. The method of making a metal organic framework adsorbent for solar adsorption refrigeration as recited in claim 1, wherein the step of sonicating the first mixture comprises sonicating the first mixture for a period of about 12 hours at room temperature.

5. The method of making a metal organic framework adsorbent for solar adsorption refrigeration as recited in claim 4, wherein the step of sonicating the second mixture comprises sonicating the second mixture for a period of about two hours at room temperature.

6. The method of making a metal organic framework adsorbent for solar adsorption refrigeration as recited in claim 5, wherein the step of heating the second mixture comprises heating the second mixture in a pressure vessel at a temperature of about 150° C. for a period of about three days.

7. The method of making a metal organic framework adsorbent for solar adsorption refrigeration as recited in claim 6, wherein the step of separating the metal organic framework nanocomposite from the heated second mixture comprises centrifugation of the second mixture.

8. The method of making a metal organic framework adsorbent for solar adsorption refrigeration as recited in claim 7, further comprising the step of washing the metal organic framework nanocomposite.

9. The method of making a metal organic framework adsorbent for solar adsorption refrigeration as recited in claim 8, further comprising the step of drying the metal organic framework nanocomposite in air following the step of washing.

10. The method of making a metal organic framework adsorbent for solar adsorption refrigeration as recited in claim 1, wherein the nitric acid and the sulfuric acid in the mixture are about 1:3 by volume.

11. The method of making a metal organic framework adsorbent for solar adsorption refrigeration as recited in claim 10, wherein the step of sonicating the solution comprises sonication at a frequency of about 40 kHz for a period of about 30 minutes.

12. The method of making a metal organic framework adsorbent for solar adsorption refrigeration as recited in claim 1, wherein the step of stirring and refluxing the solution comprises increasing the temperature of the solution from about 90° C. to about 133° C. over a period of about 4 hours.

13. The method of making a metal organic framework adsorbent for solar adsorption refrigeration as recited in claim 1, further comprising the step of rinsing the carbon nanotubes functionalized with carboxyl (COOH) groups in water following filtration thereof from the solution.

14. The method of making a metal organic framework adsorbent for solar adsorption refrigeration as recited in claim 13, further comprising the step of rinsing the carbon nanotubes functionalized with carboxyl (COOH) groups in acetone and tetrahydrofuran, following rinsing thereof in the water.

15. The method of making a metal organic framework adsorbent for solar adsorption refrigeration as recited in claim 14, wherein the step of rinsing the carbon nanotubes functionalized with carboxyl (COOH) groups in the acetone and the tetrahydrofuran is repeated four times.

16. The method of making a metal organic framework adsorbent for solar adsorption refrigeration as recited in claim 15, further comprising the step of drying the carbon nanotubes functionalized with carboxyl (COOH) groups under vacuum following rinsing thereof in the acetone and the tetrahydrofuran.

17. The method of making a metal organic framework adsorbent for solar adsorption refrigeration as recited in claim 16, wherein the step of drying the carbon nanotubes functionalized with carboxyl (COOH) groups under vacuum is performed at a temperature of about 150° C. for a period of about two days.

* * * * *